(12) United States Patent
Deninger et al.

(10) Patent No.: US 8,200,026 B2
(45) Date of Patent: *Jun. 12, 2012

(54) IDENTIFYING IMAGE TYPE IN A CAPTURE SYSTEM

(75) Inventors: William Deninger, San Jose, CA (US); Erik de la Iglesia, Mountain View, CA (US)

(73) Assignee: McAfee, Inc., Santa Clara, CA (US)

( * ) Notice: Subject to any disclaimer, the term of this patent is extended or adjusted under 35 U.S.C. 154(b) by 462 days.

This patent is subject to a terminal disclaimer.

(21) Appl. No.: 12/472,150

(22) Filed: May 26, 2009

(65) Prior Publication Data

US 2009/0232391 A1 Sep. 17, 2009

Related U.S. Application Data

(63) Continuation of application No. 11/284,553, filed on Nov. 21, 2005, now Pat. No. 7,657,104.

(51) Int. Cl.
*G06K 9/62* (2006.01)

(52) U.S. Cl. ......................... 382/224; 382/165

(58) Field of Classification Search .................. 382/224, 382/223, 195, 165, 276, 128, 173, 103; 348/172, 348/51; 707/E17.02, 999; 358/464; 345/421; 380/201; 455/420, 418; 715/788

See application file for complete search history.

(56) References Cited

U.S. PATENT DOCUMENTS

| | | |
|---|---|---|
| 4,286,255 A | 8/1981 | Siy |
| 4,710,957 A | 12/1987 | Bocci et al. |
| 5,249,289 A | 9/1993 | Thamm et al. |
| 5,465,299 A | 11/1995 | Matsumoto et al. |
| 5,479,654 A | 12/1995 | Squibb |
| 5,497,489 A | 3/1996 | Menne |
| 5,542,090 A | 7/1996 | Henderson et al. |
| 5,557,747 A | 9/1996 | Rogers et al. |
| 5,623,652 A | 4/1997 | Vora et al. |
| 5,768,578 A | 6/1998 | Kirk |
| 5,781,629 A | 7/1998 | Haber et al. |
| 5,794,052 A | 8/1998 | Harding |
| 5,813,009 A | 9/1998 | Johnson et al. |
| 5,873,081 A | 2/1999 | Harel |
| 5,937,422 A | 8/1999 | Nelson et al. |
| 5,943,670 A | 8/1999 | Prager |
| 5,995,111 A | 11/1999 | Morioka et al. |
| 6,026,411 A | 2/2000 | Delp |

(Continued)

FOREIGN PATENT DOCUMENTS

WO  WO 2004/008310  1/2004

OTHER PUBLICATIONS

U.S. Appl. No. 12/690,153, filed Jan. 20, 2010, entitled "Query Generation for a Capture System," Inventor(s) Erik de la Iglesia, et al.

(Continued)

*Primary Examiner* — Anh Hong Do
(74) *Attorney, Agent, or Firm* — Patent Capital Group

(57) ABSTRACT

Visual objects can be classified according to image type. In one embodiment, the present invention includes capturing a visual object, and decompressing the visual object to a colorspace representation exposing each pixel. The contribution of each pixel to a plurality of image types can then be determined. Then, the contributions can be combined, and the image type of the visual object can be determined based on the contributions.

30 Claims, 9 Drawing Sheets

U.S. PATENT DOCUMENTS

| | | |
|---|---|---|
| 6,078,953 A | 6/2000 | Vaid et al. |
| 6,094,531 A | 7/2000 | Allison et al. |
| 6,108,697 A | 8/2000 | Raymond et al. |
| 6,122,379 A | 9/2000 | Barbir .......................... 380/269 |
| 6,161,102 A | 12/2000 | Yanagihara et al. |
| 6,175,867 B1 | 1/2001 | Taghadoss |
| 6,192,472 B1 | 2/2001 | Garay et al. |
| 6,243,091 B1 | 6/2001 | Berstis |
| 6,243,720 B1 | 6/2001 | Munter et al. |
| 6,278,992 B1 | 8/2001 | Curtis et al. |
| 6,292,810 B1 | 9/2001 | Richards |
| 6,336,186 B1 | 1/2002 | Dyksterhouse et al. |
| 6,343,376 B1 | 1/2002 | Saxe et al. |
| 6,356,885 B2 | 3/2002 | Ross et al. |
| 6,363,488 B1 | 3/2002 | Ginter et al. |
| 6,389,405 B1 | 5/2002 | Oatman et al. |
| 6,389,419 B1 | 5/2002 | Wong et al. |
| 6,408,294 B1 | 6/2002 | Getchius et al. |
| 6,408,301 B1 | 6/2002 | Patton et al. |
| 6,457,017 B2 | 9/2002 | Watkins et al. |
| 6,493,761 B1 | 12/2002 | Baker et al. |
| 6,499,105 B1 | 12/2002 | Yoshiura et al. |
| 6,502,091 B1 | 12/2002 | Chundi et al. |
| 6,515,681 B1 | 2/2003 | Knight |
| 6,516,320 B1 | 2/2003 | Odom et al. |
| 6,523,026 B1 | 2/2003 | Gillis |
| 6,539,024 B1 | 3/2003 | Janoska et al. |
| 6,556,964 B2 | 4/2003 | Haug et al. |
| 6,556,983 B1 | 4/2003 | Altschuler et al. |
| 6,571,275 B1 | 5/2003 | Dong et al. |
| 6,598,033 B2 | 7/2003 | Ross et al. |
| 6,662,176 B2 | 12/2003 | Brunet et al. |
| 6,691,209 B1 | 2/2004 | O'Connell |
| 6,771,595 B1 | 8/2004 | Gilbert et al. |
| 6,772,214 B1 | 8/2004 | McClain et al. |
| 6,785,815 B1 | 8/2004 | Serret-Avila et al. |
| 6,820,082 B1 | 11/2004 | Cook et al. |
| 6,857,011 B2 | 2/2005 | Reinke |
| 6,937,257 B1 | 8/2005 | Dunlavey |
| 6,950,864 B1 | 9/2005 | Tsuchiya |
| 6,978,297 B1 | 12/2005 | Piersol |
| 6,978,367 B1 | 12/2005 | Hind et al. ..................... 713/167 |
| 7,020,654 B1 | 3/2006 | Najmi |
| 7,020,661 B1 | 3/2006 | Cruanes et al. |
| 7,062,572 B1 | 6/2006 | Hampton |
| 7,072,967 B1 | 7/2006 | Saulpaugh et al. |
| 7,082,443 B1 | 7/2006 | Ashby |
| 7,093,288 B1 | 8/2006 | Hydrie et al. |
| 7,158,983 B2 | 1/2007 | Willse et al. |
| 7,185,073 B1 | 2/2007 | Gai et al. |
| 7,185,192 B1 | 2/2007 | Kahn |
| 7,219,131 B2 | 5/2007 | Banister |
| 7,219,134 B2 | 5/2007 | Takeshima et al. |
| 7,243,120 B2 | 7/2007 | Massey |
| 7,246,236 B2 | 7/2007 | Stirbu |
| 7,254,562 B2 | 8/2007 | Hsu et al. |
| 7,266,845 B2 | 9/2007 | Hypponen |
| 7,277,957 B2 | 10/2007 | Rowley et al. |
| 7,290,048 B1 | 10/2007 | Barnett et al. |
| 7,296,070 B2 | 11/2007 | Sweeney et al. |
| 7,296,088 B1 | 11/2007 | Padmanabhan et al. |
| 7,299,277 B1 | 11/2007 | Moran et al. |
| 7,373,500 B2 | 5/2008 | Ramelson et al. |
| 7,424,744 B1 | 9/2008 | Wu et al. |
| 7,426,181 B1 | 9/2008 | Feroz et al. |
| 7,434,058 B2 | 10/2008 | Ahuja et al. |
| 7,477,780 B2 | 1/2009 | Boncyk et al. ................. 382/165 |
| 7,483,916 B2 | 1/2009 | Lowe et al. |
| 7,493,659 B1 | 2/2009 | Wu et al. |
| 7,506,055 B2 | 3/2009 | McClain et al. |
| 7,509,677 B2 | 3/2009 | Saurabh et al. |
| 7,516,492 B1 | 4/2009 | Nisbet et al. |
| 7,551,629 B2 | 6/2009 | Chen et al. |
| 7,596,571 B2 | 9/2009 | Sifry |
| 7,730,011 B1 | 6/2010 | Deninger et al. ............ 707/602 |
| 7,774,604 B2 | 8/2010 | Lowe et al. ................... 713/176 |
| 7,814,327 B2 | 10/2010 | Ahuja et al. ................... 713/177 |
| 7,818,326 B2 | 10/2010 | Deninger et al. ............ 707/747 |
| 7,899,828 B2 | 3/2011 | de la Iglesia et al. ......... 707/741 |
| 7,907,608 B2 | 3/2011 | Liu et al. ....................... 370/389 |
| 7,921,072 B2 | 4/2011 | Bohannon et al. ............ 707/601 |
| 7,930,540 B2 | 4/2011 | Ahuja et al. ................... 713/167 |
| 7,949,849 B2 | 5/2011 | Lowe et al. ................... 713/173 |
| 7,958,227 B2 | 6/2011 | Ahuja et al. ................... 709/224 |
| 7,962,591 B2 | 6/2011 | Deninger et al. ............. 709/223 |
| 7,984,175 B2 | 7/2011 | de La Iglesia et al. ........ 709/231 |
| 8,005,863 B2 | 8/2011 | de La Iglesia et al. ........ 707/791 |
| 8,010,689 B2 | 8/2011 | Deninger et al. ............. 709/230 |
| 8,166,307 B2 | 4/2012 | Ahuja et al. ................... 713/177 |
| 2001/0013024 A1 | 8/2001 | Takahashi et al. |
| 2001/0032310 A1 | 10/2001 | Corella |
| 2001/0037324 A1 | 11/2001 | Agrawal et al. |
| 2001/0046230 A1 | 11/2001 | Rojas |
| 2002/0032677 A1 | 3/2002 | Morgenthaler et al. |
| 2002/0032772 A1 | 3/2002 | Olstad et al. |
| 2002/0052896 A1 | 5/2002 | Streit et al. |
| 2002/0065956 A1 | 5/2002 | Yagawa et al. |
| 2002/0078355 A1 | 6/2002 | Samar |
| 2002/0091579 A1 | 7/2002 | Yehia et al. |
| 2002/0103876 A1 | 8/2002 | Chatani et al. |
| 2002/0107843 A1 | 8/2002 | Biebesheimer et al. |
| 2002/0116124 A1 | 8/2002 | Garin et al. |
| 2002/0126673 A1 | 9/2002 | Dagli et al. |
| 2002/0128903 A1 | 9/2002 | Kernahan |
| 2002/0129140 A1 | 9/2002 | Peled et al. |
| 2002/0159447 A1 | 10/2002 | Carey et al. |
| 2003/0009718 A1 | 1/2003 | Wolfgang et al. |
| 2003/0028493 A1 | 2/2003 | Tajima |
| 2003/0028774 A1 | 2/2003 | Meka |
| 2003/0046369 A1 | 3/2003 | Sim et al. |
| 2003/0053420 A1 | 3/2003 | Duckett et al. |
| 2003/0055962 A1 | 3/2003 | Freund et al. ................. 709/225 |
| 2003/0065571 A1 | 4/2003 | Dutta |
| 2003/0084300 A1 | 5/2003 | Koike |
| 2003/0084318 A1 | 5/2003 | Schertz |
| 2003/0084326 A1 | 5/2003 | Tarquini |
| 2003/0093678 A1 | 5/2003 | Bowe et al. |
| 2003/0099243 A1 | 5/2003 | Oh et al. |
| 2003/0105716 A1 | 6/2003 | Sutton et al. |
| 2003/0105739 A1 | 6/2003 | Essafi et al. |
| 2003/0105854 A1 | 6/2003 | Thorsteinsson et al. ...... 709/223 |
| 2003/0131116 A1 | 7/2003 | Jain et al. |
| 2003/0135612 A1 | 7/2003 | Huntington |
| 2003/0167392 A1 | 9/2003 | Fransdonk |
| 2003/0185220 A1 | 10/2003 | Valenci |
| 2003/0196081 A1 | 10/2003 | Savarda et al. |
| 2003/0204741 A1 | 10/2003 | Schoen et al. |
| 2003/0221101 A1 | 11/2003 | Micali |
| 2003/0225796 A1 | 12/2003 | Matsubara |
| 2003/0225841 A1 | 12/2003 | Song et al. |
| 2003/0231632 A1 | 12/2003 | Haeberlen |
| 2003/0233411 A1 | 12/2003 | Parry et al. |
| 2004/0001498 A1 | 1/2004 | Chen et al. |
| 2004/0010484 A1 | 1/2004 | Foulger et al. |
| 2004/0015579 A1 | 1/2004 | Cooper et al. ................ 709/224 |
| 2004/0036716 A1 | 2/2004 | Jordahl |
| 2004/0054779 A1 | 3/2004 | Takeshima et al. |
| 2004/0059736 A1 | 3/2004 | Willse et al. |
| 2004/0059920 A1 | 3/2004 | Godwin |
| 2004/0071164 A1 | 4/2004 | Baum |
| 2004/0111406 A1 | 6/2004 | Udeshi et al. |
| 2004/0111678 A1 | 6/2004 | Hara |
| 2004/0114518 A1 | 6/2004 | MacFaden et al. |
| 2004/0117414 A1 | 6/2004 | Braun et al. |
| 2004/0120325 A1 | 6/2004 | Ayres |
| 2004/0122863 A1 | 6/2004 | Sidman |
| 2004/0139120 A1 | 7/2004 | Clark et al. |
| 2004/0181513 A1 | 9/2004 | Henderson et al. |
| 2004/0181690 A1 | 9/2004 | Rothermel et al. |
| 2004/0194141 A1 | 9/2004 | Sanders |
| 2004/0196970 A1 | 10/2004 | Cole |
| 2004/0205457 A1 | 10/2004 | Bent et al. |
| 2004/0215612 A1 | 10/2004 | Brody |
| 2004/0220944 A1 | 11/2004 | Behrens et al. |
| 2004/0230572 A1 | 11/2004 | Omoigui |
| 2004/0249781 A1 | 12/2004 | Anderson |
| 2004/0267753 A1 | 12/2004 | Hoche |

| | | |
|---|---|---|
| 2005/0004911 A1 | 1/2005 | Goldberg et al. |
| 2005/0021715 A1 | 1/2005 | Dugatkin et al. |
| 2005/0021743 A1 | 1/2005 | Fleig et al. |
| 2005/0022114 A1 | 1/2005 | Shanahan et al. |
| 2005/0027881 A1 | 2/2005 | Figueira et al. |
| 2005/0033747 A1 | 2/2005 | Wittkotter |
| 2005/0033803 A1 | 2/2005 | Vleet et al. |
| 2005/0038788 A1 | 2/2005 | Dettinger et al. |
| 2005/0038809 A1 | 2/2005 | Abajian et al. |
| 2005/0044289 A1 | 2/2005 | Hendel et al. ................ 600/497 |
| 2005/0050205 A1 | 3/2005 | Gordy et al. |
| 2005/0055327 A1 | 3/2005 | Agrawal et al. |
| 2005/0055399 A1 | 3/2005 | Savchuk |
| 2005/0075103 A1 | 4/2005 | Hikokubo et al. |
| 2005/0091443 A1 | 4/2005 | Hershkovich et al. |
| 2005/0091532 A1 | 4/2005 | Moghe |
| 2005/0097441 A1 | 5/2005 | Herbach et al. |
| 2005/0108244 A1 | 5/2005 | Riise et al. |
| 2005/0114452 A1 | 5/2005 | Prakash |
| 2005/0120006 A1 | 6/2005 | Nye |
| 2005/0127171 A1 | 6/2005 | Ahuja et al. |
| 2005/0128242 A1 | 6/2005 | Suzuki |
| 2005/0131876 A1 | 6/2005 | Ahuja et al. |
| 2005/0132034 A1 | 6/2005 | de la Iglesia et al. |
| 2005/0132046 A1 | 6/2005 | de la Iglesia et al. |
| 2005/0132079 A1 | 6/2005 | de la Iglesia et al. |
| 2005/0132197 A1 | 6/2005 | Medlar |
| 2005/0132198 A1 | 6/2005 | Ahuja et al. |
| 2005/0132297 A1 | 6/2005 | Milic-Frayling et al. |
| 2005/0138110 A1 | 6/2005 | Redlich et al. ................ 713/166 |
| 2005/0138242 A1 | 6/2005 | Pope et al. |
| 2005/0138279 A1 | 6/2005 | Somasundaram |
| 2005/0149494 A1 | 7/2005 | Lindh et al. |
| 2005/0149504 A1 | 7/2005 | Ratnaparkhi |
| 2005/0166066 A1 | 7/2005 | Ahuja et al. |
| 2005/0177725 A1 | 8/2005 | Lowe et al. |
| 2005/0180341 A1 | 8/2005 | Nelson et al. |
| 2005/0182765 A1 | 8/2005 | Liddy |
| 2005/0188218 A1 | 8/2005 | Walmsley et al. |
| 2005/0203940 A1 | 9/2005 | Farrar et al. |
| 2005/0204129 A1 | 9/2005 | Sudia et al. |
| 2005/0228864 A1 | 10/2005 | Robertson |
| 2005/0235153 A1 | 10/2005 | Ikeda |
| 2005/0289181 A1 | 12/2005 | Deninger et al. |
| 2006/0005247 A1 | 1/2006 | Zhang et al. |
| 2006/0021045 A1 | 1/2006 | Cook |
| 2006/0021050 A1 | 1/2006 | Cook et al. |
| 2006/0037072 A1 | 2/2006 | Rao et al. |
| 2006/0041560 A1 | 2/2006 | Forman et al. |
| 2006/0041570 A1 | 2/2006 | Lowe et al. |
| 2006/0041760 A1 | 2/2006 | Huang |
| 2006/0047675 A1 | 3/2006 | Lowe et al. |
| 2006/0075228 A1 | 4/2006 | Black et al. |
| 2006/0080130 A1 | 4/2006 | Choksi |
| 2006/0083180 A1 | 4/2006 | Baba et al. |
| 2006/0106793 A1 | 5/2006 | Liang |
| 2006/0106866 A1 | 5/2006 | Green et al. |
| 2006/0150249 A1 | 7/2006 | Gassen et al. |
| 2006/0167896 A1 | 7/2006 | Kapur et al. |
| 2006/0184532 A1 | 8/2006 | Hamada et al. |
| 2006/0242126 A1 | 10/2006 | Fitzhugh |
| 2006/0242313 A1 | 10/2006 | Le et al. |
| 2006/0251109 A1 | 11/2006 | Muller et al. |
| 2006/0253445 A1 | 11/2006 | Huang et al. |
| 2006/0271506 A1 | 11/2006 | Bohannon et al. ............ 707/100 |
| 2006/0272024 A1 | 11/2006 | Huang et al. |
| 2006/0288216 A1 | 12/2006 | Buhler et al. |
| 2007/0006293 A1 | 1/2007 | Balakrishnan et al. |
| 2007/0011309 A1 | 1/2007 | Brady et al. .................. 709/224 |
| 2007/0028039 A1 | 2/2007 | Gupta et al. |
| 2007/0036156 A1 | 2/2007 | Liu et al. |
| 2007/0050334 A1 | 3/2007 | Deninger et al. |
| 2007/0050381 A1 | 3/2007 | Hu et al. |
| 2007/0050467 A1 | 3/2007 | Borrett et al. |
| 2007/0081471 A1 | 4/2007 | Talley et al. |
| 2007/0094394 A1 | 4/2007 | Singh et al. |
| 2007/0110089 A1 | 5/2007 | Essafi et al. |
| 2007/0112838 A1 | 5/2007 | Bjarnestam et al. |
| 2007/0116366 A1 | 5/2007 | Deninger et al. ............ 382/224 |
| 2007/0136599 A1 | 6/2007 | Suga |
| 2007/0162609 A1 | 7/2007 | Pope et al. |
| 2007/0226504 A1 | 9/2007 | de la Iglesia et al. |
| 2007/0226510 A1 | 9/2007 | de la Iglesia et al. |
| 2007/0248029 A1 | 10/2007 | Merkey et al. |
| 2007/0271254 A1 | 11/2007 | de la Iglesia et al. ......... 707/713 |
| 2007/0271371 A1 | 11/2007 | Ahuja et al. |
| 2007/0271372 A1 | 11/2007 | Deninger et al. |
| 2007/0280123 A1 | 12/2007 | Atkins et al. |
| 2008/0028467 A1 | 1/2008 | Kommareddy et al. |
| 2008/0091408 A1 | 4/2008 | Roulland et al. |
| 2008/0235163 A1 | 9/2008 | Balasubramanian et al. |
| 2009/0100055 A1 | 4/2009 | Wang |
| 2009/0178110 A1 | 7/2009 | Higuchi |
| 2009/0187568 A1 | 7/2009 | Morin |
| 2009/0300701 A1 | 12/2009 | Chen et al. |
| 2010/0011016 A1 | 1/2010 | Greene ........................ 707/102 |
| 2010/0011410 A1 | 1/2010 | Liu ................................ 726/1 |
| 2010/0121853 A1 | 5/2010 | de la Iglesia et al. ......... 707/713 |
| 2010/0185622 A1 | 7/2010 | Deninger et al. ............. 707/736 |
| 2010/0191732 A1 | 7/2010 | Lowe et al. ................... 707/728 |
| 2010/0268959 A1 | 10/2010 | Lowe et al. |
| 2011/0004599 A1 | 1/2011 | Deninger et al. ............. 707/747 |
| 2011/0131199 A1 | 6/2011 | Simon et al. |
| 2011/0149959 A1 | 6/2011 | Liu et al. ....................... 370/389 |
| 2011/0167212 A1 | 7/2011 | Lowe et al. ................... 711/173 |
| 2011/0167265 A1 | 7/2011 | Ahuja et al. .................. 713/168 |
| 2011/0196911 A1 | 8/2011 | de la Iglesia et al. |
| 2011/0197284 A1 | 8/2011 | Ahuja et al. ..................... 726/26 |
| 2011/0208861 A1 | 8/2011 | Deninger et al. ............. 709/223 |
| 2011/0219237 A1 | 9/2011 | Ahuja et al. .................. 713/177 |
| 2011/0258197 A1 | 10/2011 | de la Iglesia et al. |
| 2011/0276575 A1 | 11/2011 | de la Iglesia et al. |
| 2011/0276709 A1 | 11/2011 | Deninger et al. |

OTHER PUBLICATIONS

Chapter 1. Introduction, "Computer Program product for analyzing network traffic," Ethereal. Computer program product for analyzing network traffic, pp. 17-26, http://web.archive.org/web/20030315045117/www.ethereal.com/distribution/docs/user-guide, printed Mar. 12, 2009.

U.S. Appl. No. 12/190,536, filed Aug. 12, 2008, entitled "Configuration Management for a Capture/Registration System," Inventor(s) Jitendra B. Gaitonde et al.

U.S. Appl. No. 12/352,720, filed Jan. 13, 2009, entitled "System and Method for Concept Building," Inventor(s) Ratinder Paul Singh Ahuja et al.

U.S. Appl. No. 12/354,688, filed Jan. 15, 2009, entitled "System and Method for Intelligent Term Grouping," Inventor(s) Ratinder Paul Ahuja et al.

U.S. Appl. No. 12/358,399, filed Jan. 23, 2009, entitled "System and Method for Intelligent State Management," Inventor(s) William Deninger et al.

U.S. Appl. No. 12/410,875, filed Mar. 25, 2009, entitled "System and Method for Data Mining and Security Policy Management," Inventor(s) Ratinder Paul Singh Ahuja et al.

U.S. Appl. No. 12/410,905, filed Mar. 25, 2009, entitled "System and Method for Managing Data and Policies," Inventor(s) Ratinder Paul Singh Ahuja et al.

Preneel, Bart, "Cryptographic Hash Functions", Proceedings of the 3$^{rd}$ Symposium on State and Progress of Research in Cryptography, 1993, pp. 161-171.

U.S. Appl. No. 12/360,537, filed Jan. 27, 2009, entitled "Database for a Capture System," Inventor(s) Rick Lowe et al.

U.S. Appl. No. 11/254,436, filed Oct. 19, 2005, entitled "Attributes of Captured Objects in a Capture System," Inventor(s) William Deninger et al.

U.S. Appl. No. 11/900,964, filed Sep. 14, 2007, entitled "System and Method for Indexing a Capture System," Inventor(s) Ashok Doddapaneni et al.

U.S. Appl. No. 12/171,232, filed Jul. 10, 2008, entitled "System and Method for Data Mining and Security Policy Management," Inventor(s) Weimin Liu et al.

Microsoft Outlook, Out look, copyright 1995-2000, 2 pages.

Han, OLAP Mining: An Integration of OLAP with Data Mining, Oct. 1997, pp. 1-18.
International Search Report and Written Opinion and Declaration of Non-Establishment of International Search Report for International Application No. PCT/US2011/024902 mailed Aug. 1, 2011 (8 pages).
Mao et al. "MOT: Memory Online Tracing of Web Information System," Proceedings of the Second International Conference on Web Information Systems Engineering (Wise '01); pp. 271-277, (IEEE0-0-7695-1393-X/02) Aug. 7, 2002 (7 pages).
Niemi, Constructing OLAP Cubes Based on Queries, Nov. 2001, pp. 1-7.
Schultz, Data Mining for Detection of New Malicious Executables, May 2001, pp. 1-13.
U.S. Appl. No. 12/751,876, filed Mar. 31, 2010, entitled "Attributes of Captured Objects in a Capture System," Inventor(s) William Deninger, et al.
U.S. Appl. No. 12/829,220, filed Jul. 1, 2010, entitled "Verifying Captured Objects Before Presentation," Inventor(s) Rick Lowe, et al.
U.S. Appl. No. 12/873,061, filed Aug. 31, 2010, entitled "Document Registration," Inventor(s) Ratinder Paul Singh Ahuja, et al.
U.S. Appl. No. 12/873,860, filed Sep. 1, 2010, entitled "A System and Method for Word Indexing in a Capture System and Querying Thereof," Inventor(s) William Deninger, et al.
U.S. Appl. No. 12/939,340, filed Nov. 3, 2010, entitled "System and Method for Protecting Specified Data Combinations," Inventor(s) Ratinder Paul Singh Ahuja, et al.
U.S. Appl. No. 12/967,013, filed Dec. 13, 2010, entitled "Tag Data Structure for Maintaining Relational Data Over Captured Objects," Inventor(s) Erik de la Iglesia, et al.
U.S. Appl. No. 13/024,923, filed Feb. 10, 2011, entitled "High Speed Packet Capture," Inventor(s) Weimin Liu, et al.
U.S. Appl. No. 13/047,068, filed Mar. 14, 2011, entitled "Cryptographic Policy Enforcement," Inventor(s) Ratinder Paul Singh Ahuja, et al.
U.S. Appl. No. 13/049,533, filed Mar. 16, 2011, entitled "File System for a Capture System," Inventor(s) Rick Lowe, et al.
U.S. Appl. No. 13/089,158, filed Apr. 18, 2011, entitled "Attributes of Captured Objects in a Capture System," Inventor(s) Ratinder Paul Singh Ahuja, et al.
U.S. Appl. No. 13/099,516, filed May 3, 2011, entitled "Object Classification in a Capture System," Inventor(s) William Deninger, et al.
U.S. Appl. No. 13/168,739, filed Jun. 24, 2011, entitled "Method and Apparatus for Data Capture and Analysis System," Inventor(s) Erik de la Iglesia, et al.
U.S. Appl. No. 13/187,421, filed Jul. 20, 2011, entitled "Query Generation for a Capture System," Inventor(s) Erik de la Iglesia, et al.
U.S. Appl. No. 13/188,441 filed Jul. 21, 2011, entitled "Locational Tagging in a Capture System," Inventor(s) William Deninger et al.
Webopedia, definition of "filter", 2002, p. 1.
Werth, T. et al., "Chapter 1—DAG Mining in Procedural Abstraction," Programming Systems Group; Computer Science Department, University of Erlangen-Nuremberg, Germany (Sep. 19, 2011 Nonfinal Rejection).
U.S. Appl. No. 13/422,791, filed on Mar. 16, 2012, entitled "System and Method for Data Mining and Security Policy Management", Inventor, Weimin Liu.
U.S. Appl. No. 13/424,249, filed on Mar. 19, 2012, entitled "System and Method for Data Mining and Security Policy Management", Inventor, Weimin Liu.
U.S. Appl. No. 13/431,678, filed on Mar. 27, 2012, entitled "Attributes of Captured Objects in a Capture System", Inventors William Deninger, et al.
U.S. Appl. No. 13/436,275 filed on Mar. 30, 2012, entitled "System and Method for Intelligent State Management", Inventors William Deninger, et al.

| PIXEL | CONTRIBUTION A | CONTRIBUTION B |
|---|---|---|
| (0,0,0) | (0,2,0,1) | (0,2,1,2) |
| (0,0,1) | (0,2,0,1) | (0,2,1,2) |
| (0,0,2) | (0,2,0,1) | (0,2,1,2) |
| (0,0,3) | (0,2,0,1) | (0,2,1,2) |
| (0,0,4) | (0,2,0,1) | (0,2,1,2) |
| (0,0,5) | (0,1,2,1) | (0,2,1,2) |
| ⋮ | ⋮ | ⋮ |
| (252,255,255) | (0,2,0,1) | (0,2,1,2) |
| (253,255,255) | (0,2,0,1) | (0,2,1,2) |
| (254,255,255) | (0,2,0,1) | (0,2,1,2) |
| (255,255,255) | (0,2,0,1) | (0,2,1,2) |

Figure 9

IDENTIFYING IMAGE TYPE IN A CAPTURE SYSTEM

RELATED APPLICATION

This application is a continuation (and claims the benefit of priority under 35 U.S.C. §120) of U.S. application Ser. No. 11/284,553, filed Nov. 21, 2005 now U.S. Pat. No. 7,657,104, entitled "IDENTIFYING IMAGE TYPE IN A CAPTURE SYSTEM". The disclosure of the prior application is considered part of (and is incorporated by reference in) the disclosure of this application.

FIELD OF THE INVENTION

The present invention relates to computer networks, and in particular, to a capture device.

BACKGROUND

Computer networks and systems have become indispensable tools for modern business. Modern enterprises use such networks for communications and for storage. The information and data stored on the network of a business enterprise is often a highly valuable asset. Modern enterprises use numerous tools to keep outsiders, intruders, and unauthorized personnel from accessing valuable information stored on the network. These tools include firewalls, intrusion detection systems, and packet sniffer devices. However, once an intruder has gained access to sensitive content, there is no network device that can prevent the electronic transmission of the content from the network to outside the network. Similarly, there is no network device that can analyse the data leaving the network to monitor for policy violations, and make it possible to track down information leaks. What is needed is a comprehensive system to capture, store, and analyse all data communicated using the enterprises network.

BRIEF DESCRIPTION OF THE DRAWINGS

The present invention is illustrated by way of example, and not by way of limitation, in the figures of the accompanying drawings in which like reference numerals refer to similar elements and in which:

FIG. 9 is a block diagram illustrating an pixel mapping table according to one embodiment of the present invention.

DETAILED DESCRIPTION

Although the present system will be discussed with reference to various illustrated examples, these examples should not be read to limit the broader spirit and scope of the present invention. Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated.

It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Networks

Figure 1:
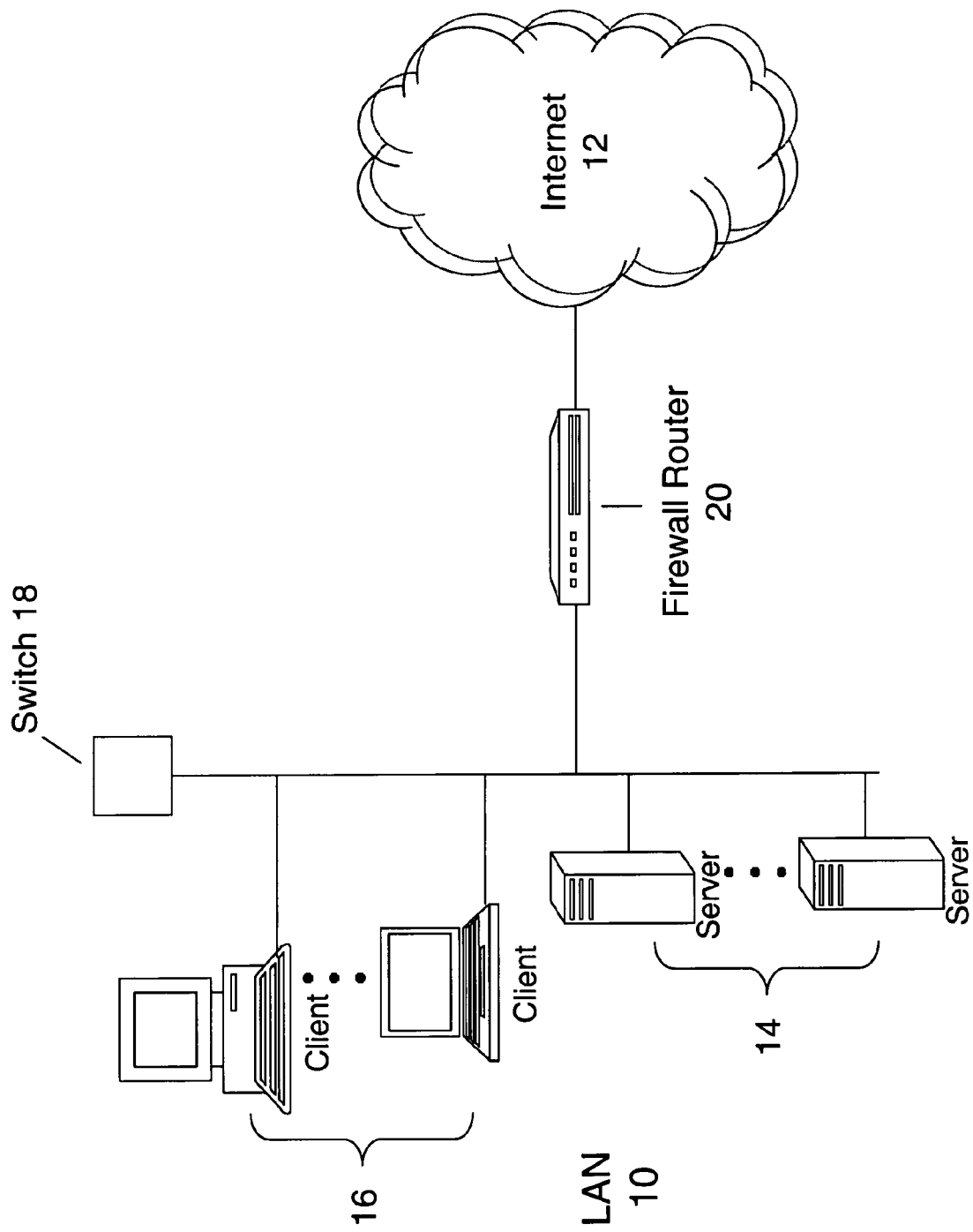
FIG. 1 is a block diagram illustrating a computer network connected to the Internet.

FIG. 1 illustrates a simple prior art configuration of a local area network (LAN) 10 connected to the Internet 12. Connected to the LAN 102 are various components, such as servers 14, clients 16, and switch 18. There are numerous other known networking components and computing devices that can be connected to the LAN 10. The LAN 10 can be implemented using various wireline or wireless technologies, such as Ethernet and 802.11b. The LAN 10 may be much more complex than the simplified diagram in FIG. 1, and may be connected to other LANs as well.

In FIG. 1, the LAN 10 is connected to the Internet 12 via a router 20. This router 20 can be used to implement a firewall, which are widely used to give users of the LAN 10 secure access to the Internet 12 as well as to separate a company's public Web server (can be one of the servers 14) from its internal network, i.e., LAN 10. In one embodiment, any data leaving the LAN 10 towards the Internet 12 must pass through the router 12. However, there the router 20 merely forwards packets to the Internet 12. The router 20 cannot capture, analyze, and searchably store the content contained in the forwarded packets.

Figure 2:
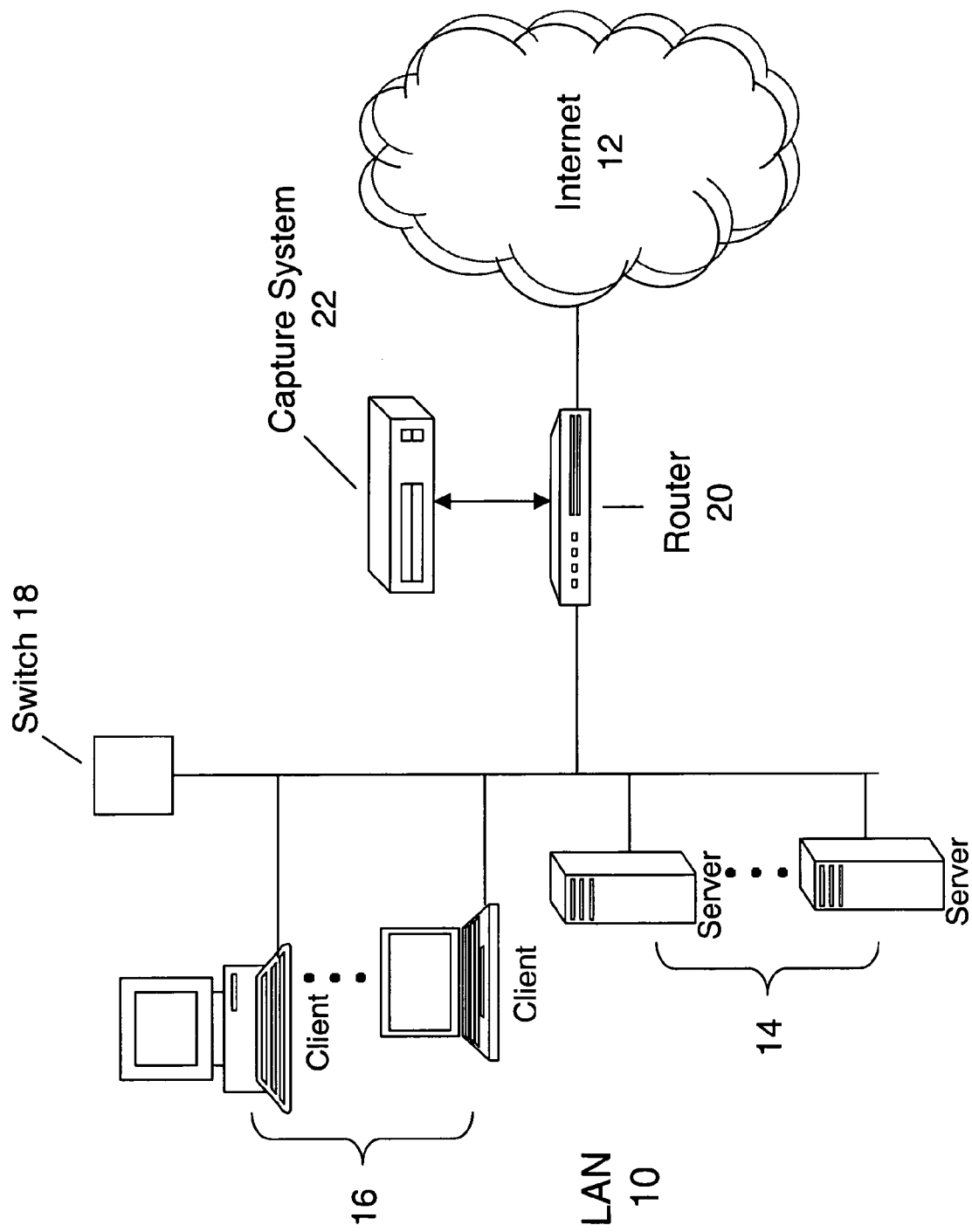
FIG. 2 is a block diagram illustrating one configuration of a capture system according to one embodiment of the present invention.

One embodiment of the present invention is now illustrated with reference to FIG. 2. FIG. 2 shows the same simplified configuration of connecting the LAN 10 to the Internet 12 via the router 20. However, in FIG. 2, the router 20 is also connected to a capture system 22. In one embodiment, the router 12 splits the outgoing data stream, and forwards one copy to the Internet 12 and the other copy to the capture system 22.

There are various other possible configurations. For example, the router 12 can also forward a copy of all incoming data to the capture system 22 as well. Furthermore, the capture system 22 can be configured sequentially in front of, or behind the router 20, however this makes the capture system 22 a critical component in connecting to the Internet 12. In systems where a router 12 is not used at all, the capture system can be interposed directly between the LAN 10 and the Internet 12. In one embodiment, the capture system 22 has a user interface accessible from a LAN-attached device, such as a client 16.

In one embodiment, the capture system 22 intercepts all data leaving the network. In other embodiments, the capture system can also intercept all data being communicated inside the network 10. In one embodiment, the capture system 22 reconstructs the documents leaving the network 10, and stores them in a searchable fashion. The capture system 22 can then be used to search and sort through all documents that have left the network 10. There are many reasons such documents may be of interest, including network security reasons, intellectual property concerns, corporate governance regulations, and other corporate policy concerns.

Capture System

Figure 3:
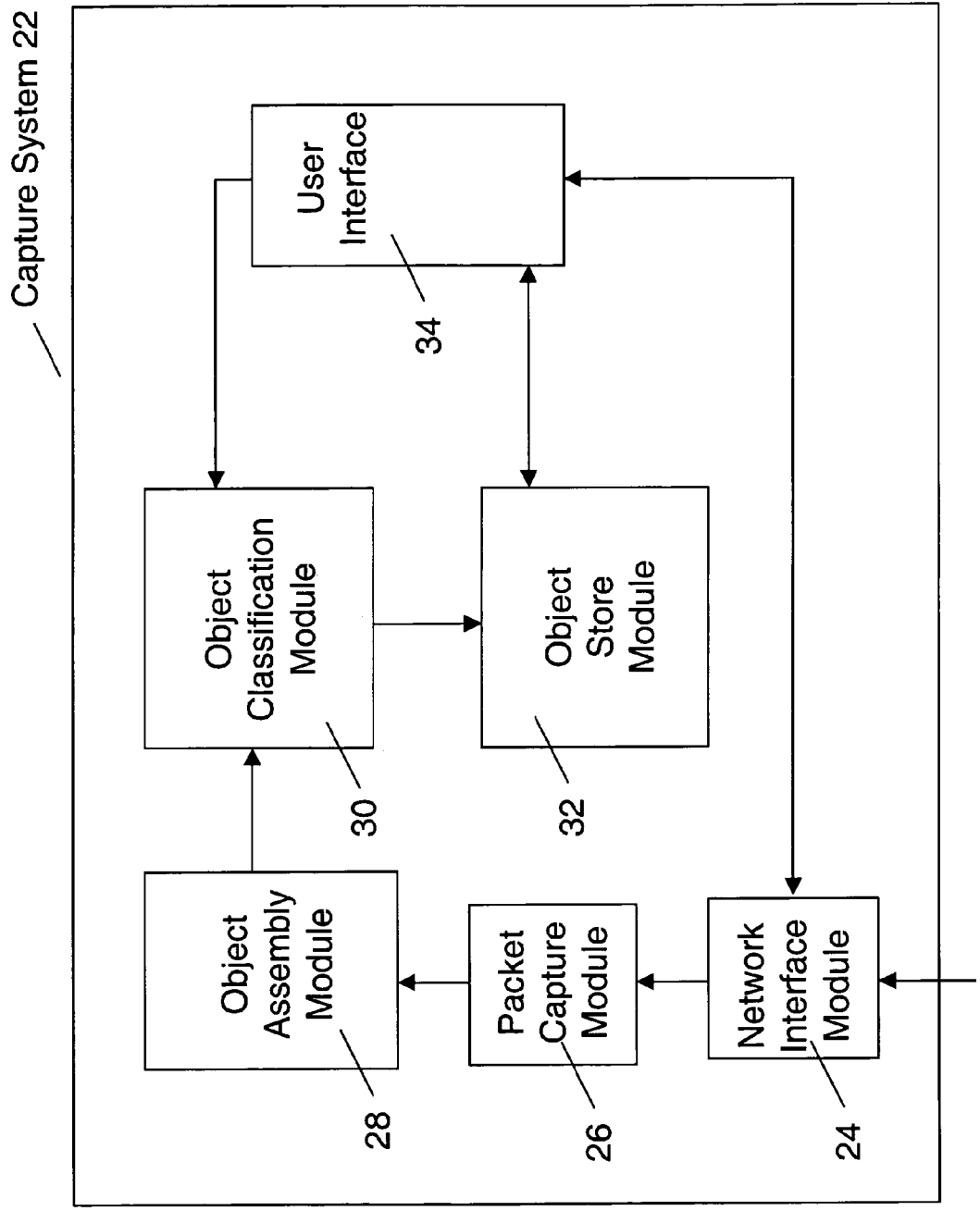
FIG. 3 is a block diagram illustrating the capture system according to one embodiment of the present invention.

One embodiment of the present invention is now described with reference to FIG. 3. FIG. 3 shows one embodiment of the capture system 22 in more detail. The capture system 22 includes a network interface module 24 to receive the data from the network 10 or the router 20. In one embodiment, the network interface module 24 is implemented using one or more network interface cards (NIC), e.g., Ethernet cards. In one embodiment, the router 20 delivers all data leaving the network to the network interface module 24.

The captured raw data is then passed to a packet capture module 26. In one embodiment, the packet capture module 26 extracts data packets from the data stream received from the network interface module 24. In one embodiment, the packet capture module 26 reconstructs Ethernet packets from multiple sources to multiple destinations for the raw data stream.

In one embodiment, the packets are then provided the object assembly module 28. The object assembly module 28 reconstructs the objects being transmitted by the packets. For example, when a document is transmitted, e.g. as an email attachment, it is broken down into packets according to various data transfer protocols such as Transmission Control Protocol/Internet Protocol (TCP/IP) and Ethernet. The object assembly module 28 can reconstruct the document from the captured packets.

Figure 4:
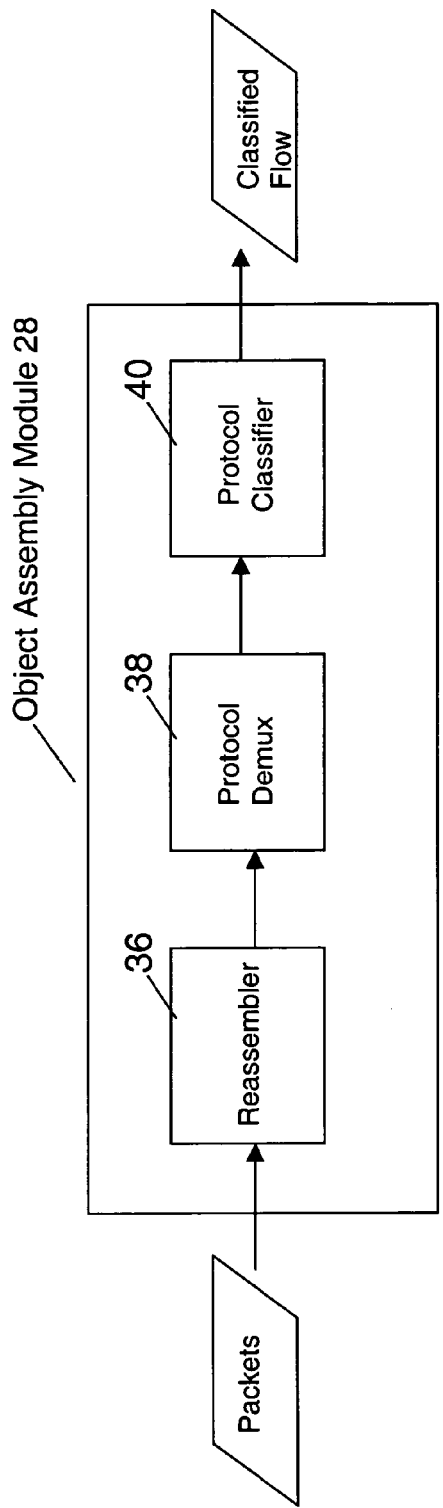
FIG. 4 is a block diagram illustrating an object assembly module according to one embodiment of the present invention.

One embodiment of the object assembly module 28 is now described in more detail with reference to FIG. 4. When packets first enter the object assembly module, they are first provided to a reassembler 36. In one embodiment, the reassembler 36 groups—assembles—the packets into unique flows. For example, a flow can be defined as packets with identical Source IP and Destination IP addresses as well as identical TCP Source and Destination Ports. That is, the reassembler 36 can organize a packet stream by sender and recipient.

In one embodiment, the reassembler 36 begins a new flow upon the observation of a starting packet defined by the data transfer protocol. For a TCP/IP embodiment, the starting packet is generally referred to as the "SYN" packet. The flow can terminate upon observation of a finishing packet, e.g., a "Reset" or "FIN" packet in TCP/IP. If now finishing packet is observed by the reassembler 36 within some time constraint, it can terminate the flow via a timeout mechanism. In an embodiment using the TPC protocol, a TCP flow contains an ordered sequence of packets that can be assembled into a contiguous data stream by the ressembler 36. Thus, in one embodiment, a flow is an ordered data stream of a single communication between a source and a destination.

The flown assembled by the reassembler 36 can then is provided to a protocol demultiplexer (demux) 38. In one embodiment, the protocol demux 38 sorts assembled flows using the TCP Ports. This can include performing a speculative classification of the flow contents based on the association of well-known port numbers with specified protocols. For example, Web Hyper Text Transfer Protocol (HTTP) packets—i.e., Web traffic—are typically associated with port 80, File Transfer Protocol (FTP) packets with port 20, Kerberos authentication packets with port 88, and so on. Thus in one embodiment, the protocol demux 38 separates all the different protocols in one flow.

In one embodiment, a protocol classifier 40 also sorts the flows in addition to the protocol demux 38. In one embodiment, the protocol classifier 40—operating either in parallel or in sequence with the protocol demux 38—applies signature filters to the flows to attempt to identify the protocol based solely on the transported data. Furthermore, the protocol demux 38 can make a classification decision based on port number, which is subsequently overridden by protocol classifier 40. For example, if an individual or program attempted to masquerade an illicit communication (such as file sharing) using an apparently benign port such as port 80 (commonly used for HTTP Web browsing), the protocol classifier 40 would use protocol signatures, i.e., the characteristic data sequences of defined protocols, to verify the speculative classification performed by protocol demux 38.

In one embodiment, the object assembly module 28 outputs each flow organized by protocol, which represent the underlying objects. Referring again to FIG. 3, these objects can then be handed over to the object classification module 30 (sometimes also referred to as the "content classifier") for classification based on content. A classified flow may still contain multiple content objects depending on the protocol used. For example, protocols such as HTTP (Internet Web Surfing) may contain over 100 objects of any number of content types in a single flow. To deconstruct the flow, each object contained in the flow is individually extracted, and decoded, if necessary, by the object classification module 30.

The object classification module 30 uses the inherent properties and signatures of various documents to determine the content type of each object. For example, a Word document has a signature that is distinct from a PowerPoint document, or an Email document. The object classification module 30 can extract out each individual object and sort them out by such content types. Such classification renders the present invention immune from cases where a malicious user has altered a file extension or other property in an attempt to avoid detection of illicit activity.

In one embodiment, the object classification module 30 determines whether each object should be stored or discarded. In one embodiment, this determination is based on a various capture rules. For example, a capture rule can indicate that Web Traffic should be discarded. Another capture rule can indicate that all PowerPoint documents should be stored, except for ones originating from the CEO's IP address. Such capture rules can be implemented as regular expressions, or by other similar means. Several embodiments of the object classification module 30 are described in more detail further below.

In one embodiment, the capture rules are authored by users of the capture system 22. The capture system 22 is made accessible to any network-connected machine through the network interface module 24 and user interface 34. In one embodiment, the user interface 34 is a graphical user interface providing the user with friendly access to the various features of the capture system 22. For example, the user interface 34 can provide a capture rule authoring tool that allows users to write and implement any capture rule desired, which are then applied by the object classification module 30 when determining whether each object should be stored. The user interface 34 can also provide pre-configured capture rules that the user can select from along with an explanation of the operation of such standard included capture rules. In one embodiment, the default capture rule implemented by the object classification module 30 captures all objects leaving the network 10.

Figure 5:
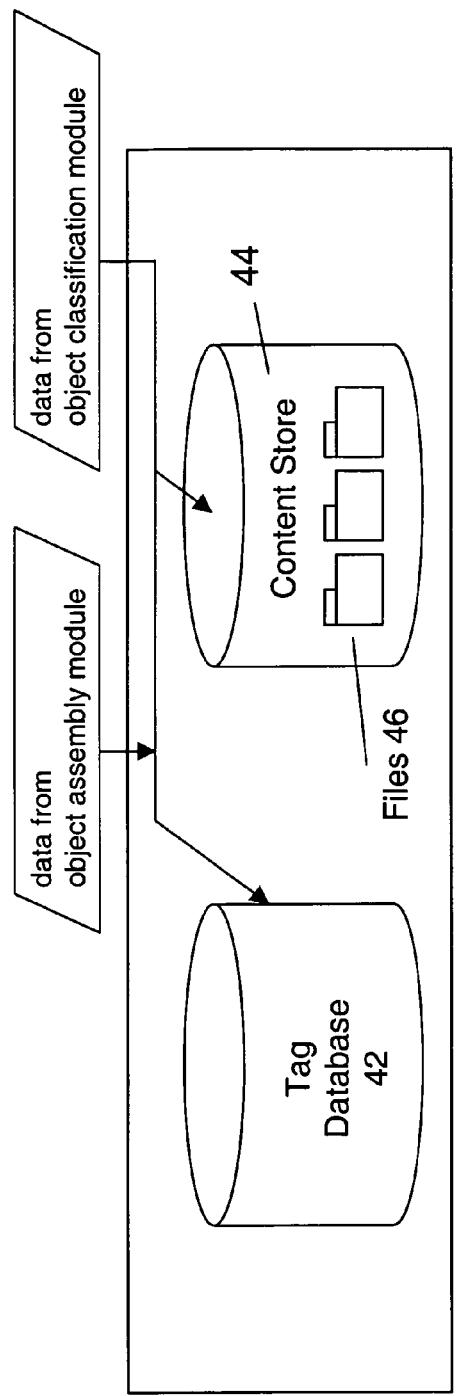
FIG. 5 is a block diagram illustrating an object store module according to one embodiment of the present invention.

If the capture of an object is mandated by the capture rules, the object classification module 30 can also determine where in the object store module 32 the captured object should be stored. With reference to FIG. 5, in one embodiment, the objects are stored in a content store 44 memory block. Within the content store 44 are files 46 divided up by content type. Thus, for example, if the object classification module determines that an object is a Word document that should be stored, it can store it in the file 46 reserved for Word documents. In one embodiment, the object store module 32 is integrally included in the capture system 22. In other embodiments, the object store module can be external—entirely or in part—using, for example, some network storage technique such as network attached storage (NAS) and storage area network (SAN).

Tag Data Structure

In one embodiment, the content store is a canonical storage location, simply a place to deposit the captured objects. The indexing of the objects stored in the content store 44 is accomplished using a tag database 42. In one embodiment, the tag database 42 is a database data structure in which each record is a "tag" that indexes an object in the content store 44 and contains relevant information about the stored object. An example of a tag record in the tag database 42 that indexes an object stored in the content store 44 is set forth in Table 1:

TABLE 1

| Field Name | Definition |
| --- | --- |
| MAC Address | Ethernet controller MAC address unique to each capture system |
| Source IP | Source Ethernet IP Address of object |
| Destination IP | Destination Ethernet IP Address of object |
| Source Port | Source TCP/IP Port number of object |
| Destination Port | Destination TCP/IP Port number of the object |
| Protocol | IP Protocol that carried the object |

TABLE 1-continued

| Field Name | Definition |
| --- | --- |
| Instance | Canonical count identifying object within a protocol capable of carrying multiple data within a single TCP/IP connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Hash signature of object |
| Tag Signature | Hash signature of all preceding tag fields |

There are various other possible tag fields, and some embodiments can omit numerous tag fields listed in Table 1. In other embodiments, the tag database 42 need not be implemented as a database, and a tag need not be a record. Any data structure capable of indexing an object by storing relational data over the object can be used as a tag data structure. Furthermore, the word "tag" is merely descriptive, other names such as "index" or "relational data store," would be equally descriptive, as would any other designation performing similar functionality.

The mapping of tags to objects can, in one embodiment, be obtained by using unique combinations of tag fields to construct an object's name. For example, one such possible combination is an ordered list of the Source IP, Destination IP, Source Port, Destination Port, Instance and Timestamp. Many other such combinations including both shorter and longer names are possible. In another embodiment, the tag can contain a pointer to the storage location where the indexed object is stored.

The tag fields shown in Table 1 can be expressed more generally, to emphasize the underlying information indicated by the tag fields in various embodiments. Some of these possible generic tag fields are set forth in Table 2:

TABLE 2

| Field Name | Definition |
| --- | --- |
| Device Identity | Identifier of capture device |
| Source Address | Origination Address of object |
| Destination Address | Destination Address of object |
| Source Port | Origination Port of object |
| Destination Port | Destination Port of the object |
| Protocol | Protocol that carried the object |
| Instance | Canonical count identifying object within a protocol capable of carrying multiple data within a single connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Signature of object |
| Tag Signature | Signature of all preceding tag fields |

For many of the above tag fields in Tables 1 and 2, the definition adequately describes the relational data contained by each field. For the content field, the types of content that the object can be labeled as are numerous. Some example choices for content types (as determined, in one embodiment, by the object classification module 30) are JPEG, GIF, BMP, TIFF, PNG (for objects containing images in these various formats); Skintone, PDF, MSWord, Excel, PowerPoint, MSOffice (for objects in these popular application formats); HTML, WebMail, SMTP, FTP (for objects captured in these transmission formats); Telnet, Rlogin, Chat (for communication conducted using these methods); GZIP, ZIP, TAR (for archives or collections of other objects); Basic_Source, C++_Source, C_Source, Java_Source, FORTRAN_Source, Verilog_Source, VHDL_Source, Assembly_Source, Pascal_Source, Cobol_Source, Ada_Source, Lisp_Source, Perl_Source, XQuery_Source, Hypertext Markup Language, Cascaded Style Sheets, JavaScript, DXF, Spice, Gerber, Mathematica, Matlab, AllegroPCB, ViewLogic, TangoPCAD, BSDL, C_Shell, K_Shell, Bash_Shell, Bourne_Shell, FTP, Telnet, MSExchange, POP3, RFC822, CVS, CMS, SQL, RTSP, MIME, PDF, PS (for source, markup, query, descriptive, and design code authored in these high-level programming languages); C Shell, K Shell, Bash Shell (for shell program scripts); Plaintext (for otherwise unclassified textual objects); Crypto (for objects that have been encrypted or that contain cryptographic elements); Englishtext, Frenchtext, Germantext, Spanishtext, Japanesetext, Chinesetext, Koreantext, Russiantext (any human language text); Binary Unknown, ASCII Unknown, and Unknown (as catchall categories).

The signature contained in the Signature and Tag Signature fields can be any digest or hash over the object, or some portion thereof. In one embodiment, a well-known hash, such as MD5 or SHA1 can be used. In one embodiment, the signature is a digital cryptographic signature. In one embodiment, a digital cryptographic signature is a hash signature that is signed with the private key of the capture system 22. Only the capture system 22 knows its own private key, thus, the integrity of the stored object can be verified by comparing a hash of the stored object to the signature decrypted with the public key of the capture system 22, the private and public keys being a public key cryptosystem key pair. Thus, if a stored object is modified from when it was originally captured, the modification will cause the comparison to fail.

Similarly, the signature over the tag stored in the Tag Signature field can also be a digital cryptographic signature. In such an embodiment, the integrity of the tag can also be verified. In one embodiment, verification of the object using the signature, and the tag using the tag signature is performed whenever an object is presented, e.g., displayed to a user. In one embodiment, if the object or the tag is found to have been compromised, an alarm is generated to alert the user that the object displayed may not be identical to the object originally captured.

Image Classification

A user may be interested in the type of image and graphical objects being transmitted over the network. Furthermore, a user may want to query to system for object containing a specific type of image. Also, some policies regarding object transmission may depend on the type of an image. For example, a user may want to set up a policy to intercept all incoming or outgoing pornographic images. Alternatively, a user may want to search all emails sent out last week containing an X-ray image. Thus, in one embodiment, the capture system 22 identifies the image type of visual, image, or graphical objects. This identification can then be inserted into a tag associated with the object to help process user queries.

One embodiment of the present invention is now described with reference to FIG. 7. In the embodiment described with reference to FIG. 7, the image classification functionality is implemented in the object classification module 30 described above. However, the image classification process and modules may be implemented in other parts of the capture system 22 or as a separate module.

Figure 7:
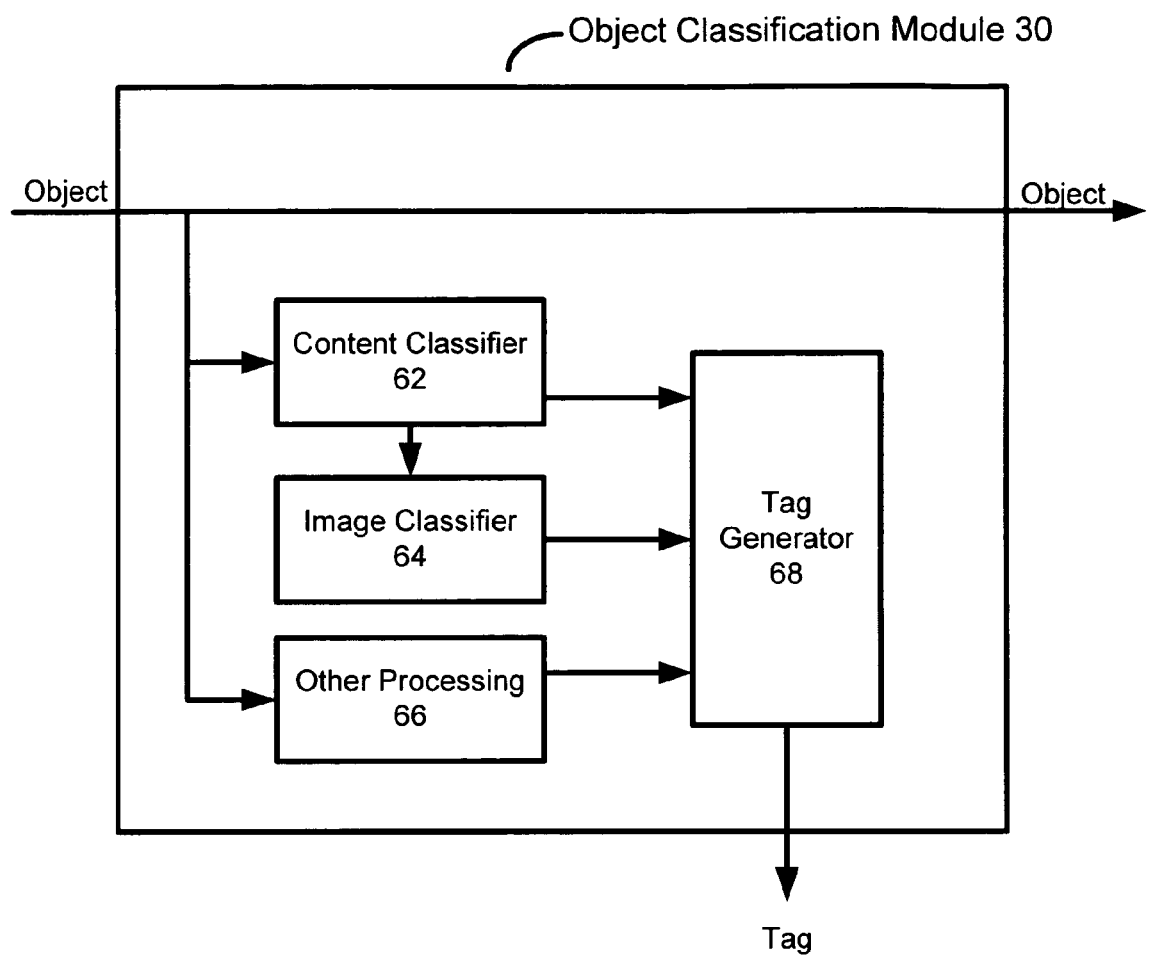
FIG. 7 is a block diagram illustrating an object classification module according to one embodiment of the present invention.

FIG. 7 illustrates a detailed diagram of one embodiment of the object classification module 30. Objects arriving from the object assembly module 28 are forwarded to the content store, and used to generate the tag to be associated with the object. For example, one module called the content classifier 62 can determine the content type of the object. The content type is then forwarded to the tag generator 68 where it is inserted into the content field described above. Various other such processing, such as protocol and size determination, is represented by other processing block 66.

In one embodiment, the image classifier 64 identifies the image type for a visual object that can be inserted into an field of the tag by the tag generator 68. For example, the tag described with reference to Table 1 and Table 2 can have an additional filed called "Image Type," or "Color Tone," or some other similar descriptive name. In one embodiment, the image classifier 64 is only activated if the content classifier 62 identifies the object as a visual object.

Image types or color tone types (these two descriptive terms are used interchangeably herein) are identifiable because certain kind of visual objects have identifiable patters of colors, color variations, shades or textures. For example, most astrological images contain a lot of black pixels.

A pixel (or picture element) is a basic unit of programmable color on a computer display or in a computer image. The color of a pixel can be described digitally according to a color space. For example, in the RBG color space, a pixel describes some blend of red, blue, and green components of the color spectrum. A 24-bit color system uses one byte to specify the intensity of each component. There are other color spaces. Pixels and their representations are well understood by those skilled in the art.

Figure 8:
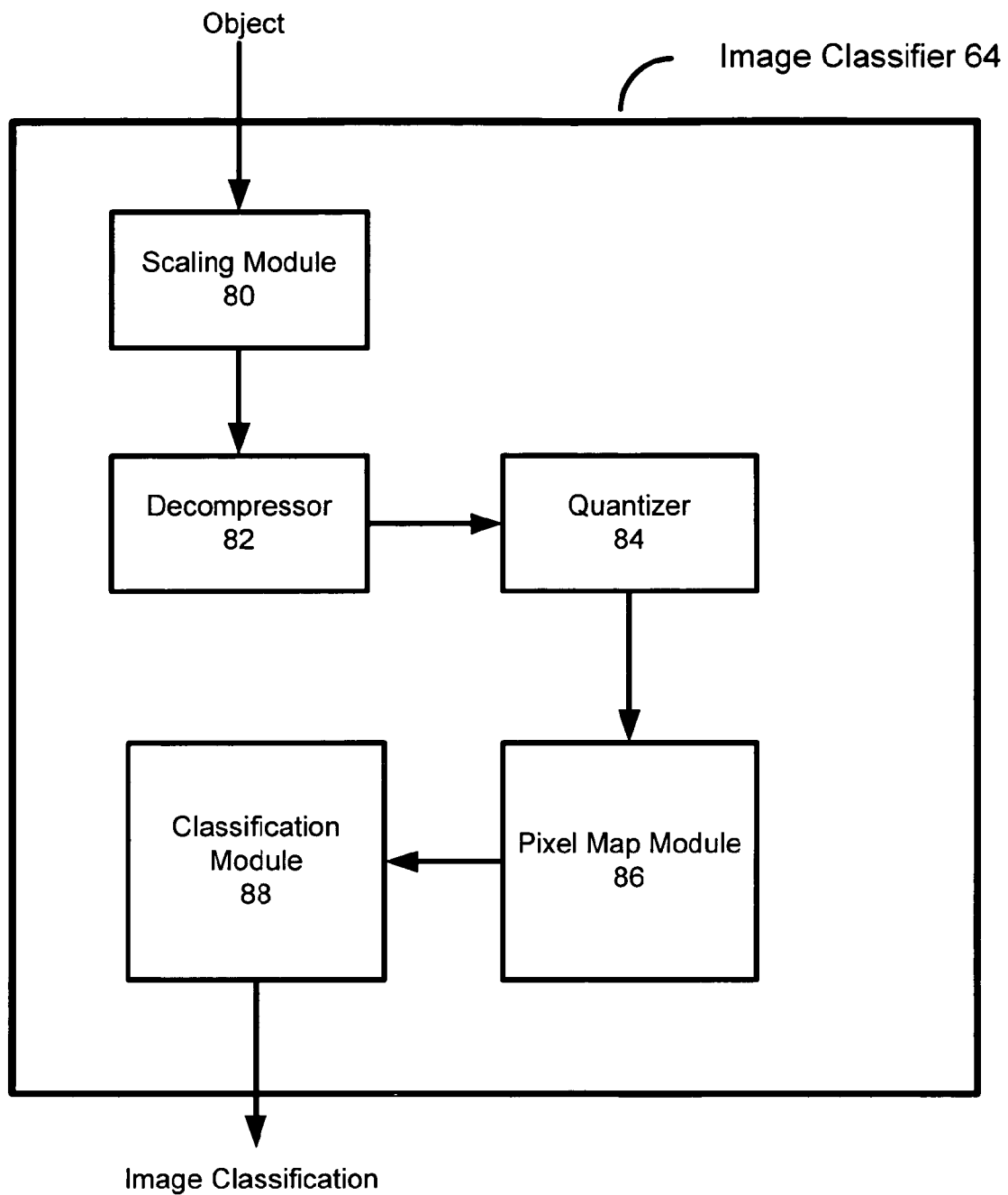
FIG. 8 is a block diagram illustrating an image classifier according to one embodiment of the present invention.

One embodiment of the image classifier 64 is now described with reference to FIG. 8. The visual object, in one embodiment, if first received by a scaling module 80. The scaling module 80 selects a portion of the image, up to the entire image. For example, for a large image, it may be efficient to base image classification on a portion of the image. For example, whether an image is an astronomical photograph or not can be gleaned from a relatively small portion of a large image. Similarly, whether an image includes skintone can also be gleaned from a portion of the image. A skintone image can be defined as an image containing primarily pixels with an RGB color space similar to that of human skin. Further distinctions regarding the percentage of the image containing such RGB space are also possible, such as skintone divisions by ethnicity. Although a skintone image is likely to be pornographic in nature, it may also be an image of an inanimate object that happens to be a color within the RGB color space defined for skintone.

In one embodiment, the scaling module 80 performs scaling based on object size and shape. For a very large square object, for example, the scaling module 80 may select the middle ninth in the center of the image. For a long rectangular banner-like object, for example, the entire height would be selected, but only the middle third of the width. For smaller objects or high-priority objects, the entire object may be selected.

The selected portion of the visual object is then passed to the decompressor 82. The decompressor 82 decompresses the image from its native format—such as Joint Photographic Experts Group (JPEG) or Graphics Interchange Format (GIF)—into raw pixels of a standard color space, such as the 24-bit RBG color space. Thus, the output of the decompressor 82 is a group of pixels. Image decompression is well understood by those skilled in the art.

In one embodiment, the pixels from the decompressor 82 are passed to a quantizer 84. The quantizer 84 may quantize the pixels to reduce the number of possible pixels. For example, the quantizer 84 may only take the seven most significant bits of each pixel. Both the scaling module 80 and the quantizer 84 are optional and may be omitted from embodiments of the present invention that do not utilize scaling of the visual object or quantizing of the pixels.

In one embodiment, the pixels are provided to the pixel map module 86. The pixel map module 86, in one embodiment, maps each pixel to a contribution of the pixel to various image types. For example, in one embodiment, the image types can be skintone (human skin color), X-ray, graph images, and astrological. In a real-world embodiment, there can be many more image classifications or types including but not limited to geographic images, circuit design masks, banner advertisements and greyscales. Any type of image or visual object having distinguishing color characteristics can be given its classification using training.

However, in this simplified embodiment with only four possible image types, the pixel map module 86 maps a pixel to the contribution of the pixel to the likelihood that the image contains human skin, an X-ray image, a graph, or an astrological image. In one embodiment, the pixel map module 86 performs this mapping by accessing a pixel mapping table, an example of which is now discussed with reference to FIG. 9.

FIG. 9 shows a table associating each pixel in a color space with a contribution to four possible image types. FIG. 9 actually shows two sets of contributions, Contribution A and Contribution B, to be discussed further below.

For example, using Contribution A of the table shown in FIG. 9, pixel (0,0,4)—a very light blue pixel—would map to (0,1,2,1). This means that pixel (0,0,4) contributes 0 to the image possible being skintone, 1 to the image possible being an X-ray, 2 to the image possible being a graph, and 1 to the image possible being an astrological image. (This is just an example, not a real world mapping) The values 0 to 2 may be given names such as zero contribution for 0, weak contribution for 1, and strong contribution to 2.

As seen in FIG. 9, in one embodiment, the pixel map module 86 can use different mappings for different pixels or groups of pixels. For example, certain colors may have more significance if found in specific locations in an image. Thus, pixels from the center of an image, for example, may be mapped using a different map than pixels from the edge of the image.

As an example, the pixel map table in FIG. 9 has two maps, shown as Contribution A and Contribution B. Other embodiments, can implement more maps as well. Thus, the pixel map module 86 can select which mapping to use based on information about each pixel.

Referring again to FIG. 8, in one embodiment, the contributions of each pixel to the possible image types—as determined by the pixel map module 86—are provided to the classification module 88. In one embodiment, the classification module calculates the sum of all contributions for all pixels. This can be done in parallel with the pixel map module 86 performing the mapping. In this example, the end sum will be in the form of a four-tuple such as (12453, 354553, 25545, 53463), with each number of the four-tuple representing the contribution of all selected pixels to each possible image type.

In one embodiment, the classification module 88 next determines the image type (or multiple possible image types), by comparing the contributions against a threshold. For example, X-ray may be defined as anything about 200,000 to X-ray contribution (for an image this particular size) is probably an X-ray. If multiple thresholds are met, then multiple classifications may be assigned. Alternately, how much the threshold is exceeded may be a factor to elimination one of the possible image types.

In one embodiment, the thresholding performed by the classification module 88 is sensitive to the size of the image, and more specifically, to the number of pixels selected by the scaling module 80. Image types can be defined in terms of percentages, which may need to be translated to thresholds by the classification module 88. For example, an astrological image can be defined as an image having 95 percent black or "near black" pixels. The threshold for this definition can than be calculated as 1.9 times the number of pixels sampled, where 2 is the strong contribution.

Both the definitions of different image types and the pixel map table shown in FIG. 9 can be populated by training the system using known images. For example, by recording the RGB pixel histograms of several sample images, certain "strong" indicators (RGB values of strong presence in the samples) could be identified. Additionally, "weak" indicators (RGB values missing or present in only small quantities) can be obtained.

In one embodiment, by creating a contribution mapping with the strong indicators at 2, the weak indicators at zero, and the remaining RGB combinations at 1, a first attempt at "training" to recognize a new image type can be accomplished. This training would include further iterations based on negative samples (images deemed not to belong to the new image class). In one embodiment, for such "negative training" the indicators would be reversed.

The image classification, or classifications, as determined by the image classifier 64 can be inserted into the tag generated by the tag generator 68, or it can become associated with the visual object in some other manner. In one embodiment, the image type is appended to the content filed in the case of visual objects. For example, the content filed would say "JPEG image::Skintone."

Figure 10:
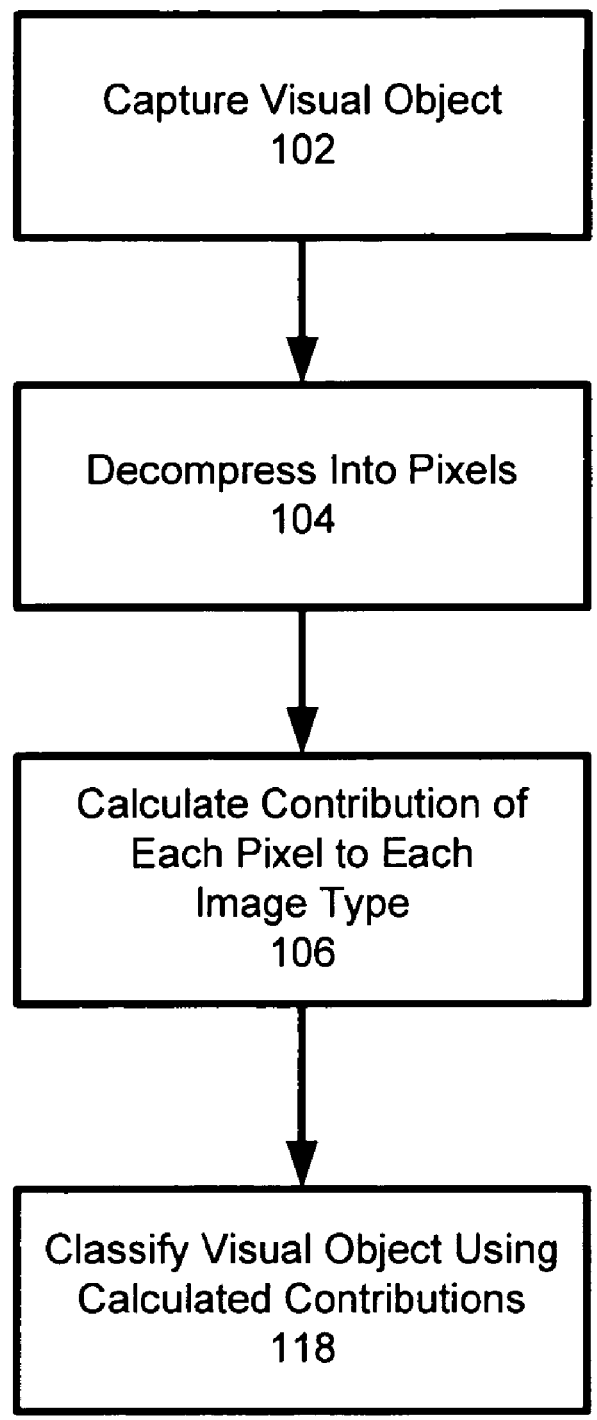
FIG. 10 is a flow diagram illustrating image classification according to one embodiment of the present invention.

One simplified embodiment of visual object classification processing is now described with reference to FIG. 10. In block 102 a visual object is captured over a network, the visual object containing some form of visual content such as an image, graphics, or other type of visual content. In block 104, the visual object is decompressed to expose its pixels.

In block 106, the contribution of each pixel to each possible image type is calculated. This can be done by using one or more mappings as explained with reference to FIG. 9. Finally, in block 108, the visual object is classified by assigning an image type to the object.

General Matters

In several embodiments, the capture system 22 has been described above as a stand-alone device. However, the capture system of the present invention can be implemented on any appliance capable of capturing and analyzing data from a network. For example, the capture system 22 described above could be implemented on one or more of the servers 14 or clients 16 shown in FIG. 1. The capture system 22 can interface with the network 10 in any number of ways, including wirelessly.

Figure 6:
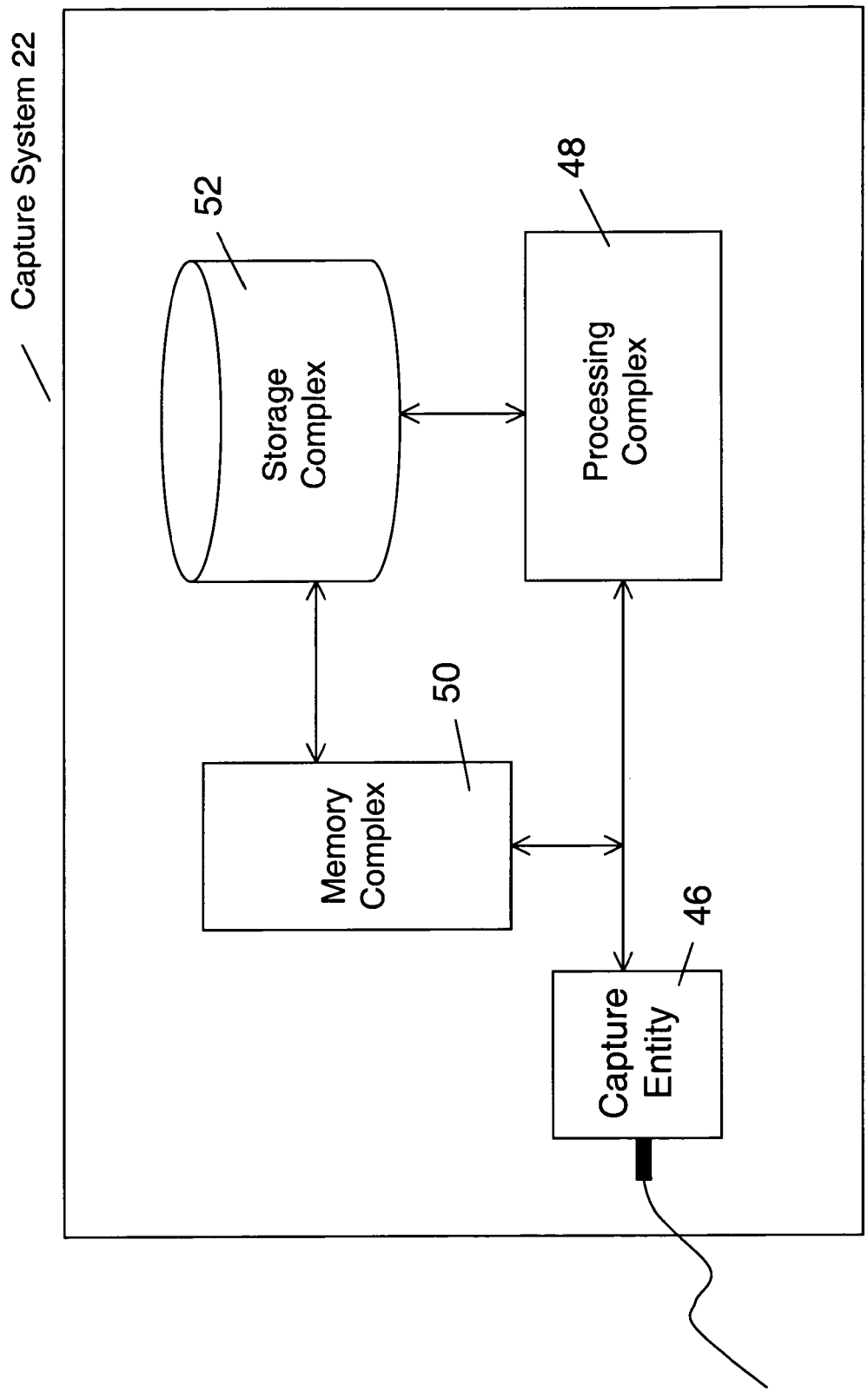
FIG. 6 is a block diagram illustrating an example hardware architecture for a capture system according to one embodiment of the present invention.

In one embodiment, the capture system 22 is an appliance constructed using commonly available computing equipment and storage systems capable of supporting the software requirements. In one embodiment, illustrated by FIG. 6, the hardware consists of a capture entity 46, a processing complex 48 made up of one or more processors, a memory complex 50 made up of one or more memory elements such as RAM and ROM, and storage complex 52, such as a set of one or more hard drives or other digital or analog storage means. In another embodiment, the storage complex 52 is external to the capture system 22, as explained above. In one embodiment, the memory complex stored software consisting of an operating system for the capture system device 22, a capture program, and classification program, a database, a filestore, an analysis engine and a graphical user interface.

Thus, a capture system and a word indexing scheme for the capture system have been described. In the forgoing description, various specific values were given names, such as "objects," and various specific modules and tables, such as the "attribute module" and "general expression table" have been described. However, these names are merely to describe and illustrate various aspects of the present invention, and in no way limit the scope of the present invention. Furthermore various modules can be implemented as software or hardware modules, or without dividing their functionalities into modules at all. The present invention is not limited to any modular architecture either in software or in hardware, whether described above or not.

The invention claimed is:

1. A method to be executed in an electronic environment in which a processor is used, comprising:
    receiving an object sought to be transmitted over a network;
    determining a contribution of pixels associated with the object; and
    determining an image type of the object based on the contribution of the pixels.

2. The method of claim 1, wherein the determining of the contribution of the pixels comprises mapping a selected pixel to possible values to quantify a contribution of the selected pixel to the image type.

3. The method of claim 2, wherein the mapping of the selected pixel is based on a position of the selected pixel within the object.

4. The method of claim 2, wherein the mapping of the selected pixel comprises mapping the selected pixel to the possible values that indicate no contribution, a weak contribution, or a strong contribution to a particular image type.

5. The method of claim 2, wherein the mapping is different for particular pixels at an edge of the object than for particular pixels in a center area of the object.

6. The method of claim 1, further comprising:
    selecting a portion of the object for determining the contribution of the pixels associated with the object.

7. The method of claim 6, wherein the selecting of the portion is based on a size, a shape, or particular dimensions of the object.

8. The method of claim 1, further comprising:
    decompressing an object from its native format to a plurality of pixels of a color space.

9. The method of claim 1, further comprising:
    classifying the object as related to the image type if a sum of the contributions of the pixels of the image type exceeds a predetermined threshold.

10. The method of claim 9, wherein exceeding the threshold is used to eliminate one of the image types from possible consideration as a correct image type for the object.

11. The method of claim 1, wherein the image type comprises a plurality of image types that include one or more of a skintone image type, an x-ray image type, a grayscale image type, a graph image type, an astrological image type, a geographic image type, a circuit design mask image type, and a banner advertisement image type.

12. The method of claim 1, further comprising:
    configuring a policy that outlines one or more image types that are prohibited from being transmitted over the network.

13. The method of claim 1, further comprising:
    querying for one or more image types sought to be transmitted over the network.

14. The method of claim 1, further comprising:
    providing a tag that identifies the object as being related to a particular image type.

15. The method of claim 14, further comprising:
    storing the tag in a database, wherein the tag can be used in processing a query for one or more image types.

16. An apparatus, comprising:
    a capture element configured to receive an object sought to be transmitted over a network;
    a classification module configured to determine a contribution of pixels associated with the object; and
    an image classifier module configured to determine an image type of the object based on the contribution of the pixels.

17. The apparatus of claim 16, further comprising:
    a pixel map module configured to map a selected pixel to possible values to quantify a contribution of the selected pixel to the image type.

18. The apparatus of claim 17, wherein the mapping of the selected pixel is based on a position of the selected pixel within the object.

19. The apparatus of claim 17, wherein the mapping of the selected pixel comprises mapping the selected pixel to the possible values that indicate no contribution, a weak contribution, or a strong contribution to a particular image type.

20. The apparatus of claim 17, wherein the mapping is different for particular pixels at an edge of the object than for particular pixels in a center area of the object.

21. The apparatus of claim 16, further comprising:
    a scaling module configured to select a portion of the object for determining the contribution of the pixels associated with the object.

22. The apparatus of claim 21, wherein the selecting of the portion is based on a size, a shape, or particular dimensions of the object.

23. The apparatus of claim 16, further comprising:
    a decompressing module configured to decompress an object from its native format to a plurality of pixels of a color space.

24. The apparatus of claim 16, further comprising:
    a tag generator configured to provide a tag that identifies the object as being related to a particular image type.

25. The apparatus of claim 24, further comprising:
    a memory element configured to store the tag, wherein the tag can be used in processing a query for one or more image types.

26. Logic encoded in non-transitory media for execution and when executed by a processor is operable to:
    receive an object sought to be transmitted over a network;
    determine a contribution of pixels associated with the object; and
    determine an image type of the object based on the contribution of the pixels.

27. The logic of claim 26, wherein the determining of the contribution of the pixels comprises mapping a selected pixel to possible values to quantify a contribution of the selected pixel to the image type, wherein the mapping of the selected pixel is based on a position of the selected pixel within the object.

28. The logic of claim 26, wherein the code is further operable to:
    select a portion of the object for determining the contribution of the pixels associated with the object, wherein the selecting of the portion is based on a size, a shape, or particular dimensions of the object.

29. The logic of claim 26, wherein the code is further operable to classify the object as related to the image type if a sum of the contributions of the pixels of the image type exceeds a predetermined threshold, and wherein exceeding the threshold is used to eliminate one of the image types from possible consideration as a correct image type for the object.

30. The logic of claim 26, wherein the code is further operable to:

configure a policy that outlines one or more image types that are prohibited from being transmitted over the network.

* * * * *